United States Patent [19]

Kaminski

[11] 4,403,178

[45] Sep. 6, 1983

[54] APPARATUS FOR CONTROLLING A TWO-SPEED AXLE SHIFT MOTOR

[75] Inventor: David C. Kaminski, Sylvania, Ohio

[73] Assignee: Dana Corporation, Toledo, Ohio

[21] Appl. No.: 226,163

[22] Filed: Jan. 19, 1981

[51] Int. Cl.³ .............................................. H01H 7/00
[52] U.S. Cl. ....................................... 318/484; 318/3
[58] Field of Search ............... 318/287, 291, 293, 294, 318/264, 452, 484, 3

[56] References Cited

U.S. PATENT DOCUMENTS

| | | |
|---|---|---|
| 2,349,185 | 5/1944 | Matulaitis . |
| 2,373,902 | 4/1945 | Matulaitis . |
| 2,663,199 | 12/1953 | Harrison . |
| 2,671,351 | 5/1954 | Neracher . |
| 3,360,707 | 12/1967 | Lewis . |
| 3,748,557 | 7/1973 | Mittelstaedt . |
| 3,888,142 | 6/1975 | Ziegele . |
| 3,942,086 | 3/1976 | Bresler ........................ 318/484 X |
| 4,034,627 | 7/1977 | Mizote . |
| 4,107,776 | 8/1978 | Beale . |
| 4,117,747 | 10/1978 | Windsor . |
| 4,155,277 | 5/1979 | Minami et al. . |
| 4,200,826 | 4/1980 | Calusio ............................. 318/484 |
| 4,323,827 | 4/1982 | Young et al. ................. 318/452 X |

FOREIGN PATENT DOCUMENTS 54-39820  3/1979  Japan ................................. 318/294

Primary Examiner—J. V. Truhe
Assistant Examiner—W. E. Duncanson, Jr.
Attorney, Agent, or Firm—Wilson, Fraser, Barker & Clemens

[57] ABSTRACT

An electronic control means is utilized in an electrically actuated shift apparatus for a multi-speed axle including an electric power source and an electric motor coupled to actuate means for shifting the axle. Four Darlington pairs are connected in a bridge configuration between the power source and the armature of the motor for bi-directional operation of the motor. A manually actuatable shift lever has magnetic means attached thereto for generating magnetic shift signals to magnetically actuatable switches. The switches are connected in pairs with each pair alternately connecting a capacitor to the power source to charge and then connecting the capacitor to the input to a control Darlington pair which turns on two associated Darlington pairs of the bridge to allow current to flow through the motor for one direction of rotation. In the same manner, the other pair of switches is actuated in the opposite sequence such that the other one of the capacitors is charging while the one capacitor is discharging to operate the motor in the desired shifting mode. The discharging time of each capacitor is selected to fall between the minimum time required to actuate the motor and associated shift mechanism to shift from one speed to the other and the probable burnout time of the motor. In an alternate embodiment, the Darlington pair bridge is replaced by a pair of diode transistor combinations with each transistor alternately being turned on by the associated capacitor. The switch pairs are replaced by a single pole, double throw switch connected between the power supply and the diodes to provide power to the motor and charge the capacitors.

15 Claims, 4 Drawing Figures

APPARATUS FOR CONTROLLING A TWO-SPEED AXLE SHIFT MOTOR

BACKGROUND OF THE INVENTION

1. Field of the Invention

The present invention relates in general to an apparatus for shifting a two-speed axle for a vehicle and in particular to a control apparatus for an electric motor actuated shifting apparatus.

2. Description of the Prior Art

In truck-type vehicles where heavy loads are being hauled, it is advantageous to have available a plurality of gear ratios between the engine and the drive wheels for quickly and efficiently bringing the vehicle up to speed and maintaining a desired engine speed at various road speeds. One method of obtaining a relatively large number of gear ratios is to utilize a multi-speed transmission with a multi-speed drive axle. For example, a four speed transmission and a two-speed axle combination provides eight gear ratios.

In one prior art two-speed axle control, an electric motor is utilized to actuate the shift mechanism. The motor is bi-directional and, therefore, is actuated in one direction to shift into low speed and the other direction to shift into high speed. The motor control circuit utilizes limit switches to sense when the motor reaches the fully shifted position and break the power circuit to the motor. Such switches are subject to power surges and arcing. If the switch fails in the closed mode, the motor will continue to operate until the switch is broken or the motor burns up.

SUMMARY OF THE INVENTION

The present invention relates to a control means for operating an electric motor to actuate a shift mechanism for a multi-speed vehicle axle. The control circuit is described in terms of shifting between low and high speeds upon the actuation of a manually actuated shift lever. The shift lever has attached thereto magnetic means which operates two pairs of switches, one pair in each of the low and high positions. The motor is bi-directional and has its armature connected to a power source through a bridge circuit. The bridge circuit is defined by four Darlington pairs, with two of the pairs connected for current flow in one direction and the other two pairs connected for current flow in the opposite direction. Each pair of Darlington pairs is turned on and off by an associated Darlington pair which in turn is controlled by magnetically actuated switches.

When the switch lever is in the low position, one of the switches connects its associated capacitor to the power source to be charged up. The other switch connects its associated capacitor to the input to the control Darlington pair to turn on the associated two Darlington pairs in the bridge circuit and allow current flow. The discharge time constant of the capacitor is selected such that current flows through the motor armature for a predetermined time greater than the minimum time required to shift the axle from the one speed to the other and less than the probable burnout time of the motor. When the lever is switched to the other position, the other pair of switches will reverse the connection of the capacitors and the capacitor that was just charged will discharge to turn on a control Darlington pair and the associated Darlington pairs in the bridge for current flow to operate the motor in the opposite direction.

It is the object of the present invention to provide multi-speed axle shift control means having increased protection against switch failure and motor burnout.

It is another object of the present invention to provide a multi-speed axle shift control means which eliminates motor current switch contacts.

It is a further object of the present invention to provide a multi-speed axle shift control means having increased reliability.

DESCRIPTION OF THE PREFERRED EMBODIMENTS

The present invention concerns a control circuit for an electric motor actuated multi-speed axle shift control mechanism. For the purpose of ease of description, the control circuit will be shown in connection with a two-speed axle having a high speed and a low speed position. The shift mechanisms attached to the output shaft of the electric motor and the axle are conventional and, therefore, are not shown in detail.

Figure 1:
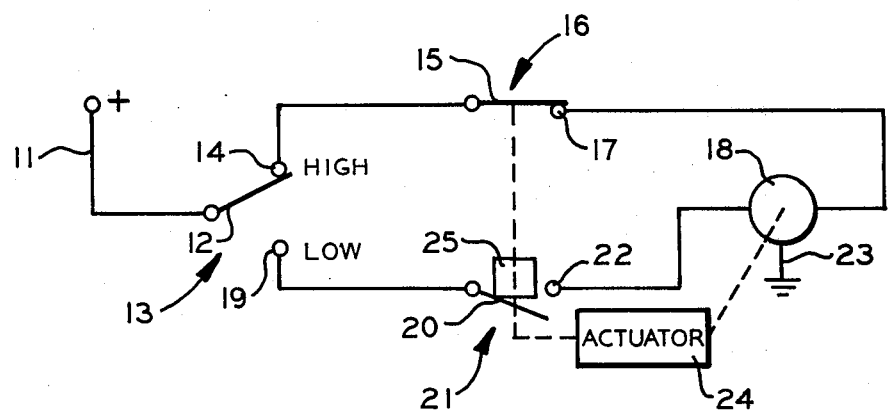
FIG. 1 is a schematic diagram of a prior art control circuit for an electric motor actuated two-speed axle shift apparatus.

There is shown in FIG. 1 a schematic diagram of the electric control circuit for a prior art electric motor actuated shift mechanism for a two-speed axle. A positive potential terminal of a vehicle power supply (not shown) is connected to an input line 11 of the circuit. The input line 11 is connected to a moveable contact 12 of a single pole, double throw switch 13. A fixed contact 14 of the switch 13 is connected to a moveable contact 15 of a single pole, single throw switch 16. A fixed contact 17 of the switch 16 is connected to an armature winding of a bidirectional, direct current electric motor 18.

A second fixed contact 19 of the switch 13 is connected to a moveable contact 20 of a single pole, single throw switch 21. A fixed contact 22 of the switch 21 is connected to the armature winding of the motor 18. The armature winding is also connected to a negative or ground potential terminal of the vehicle power supply by a return line 23. The armature winding is connected in such a manner that the motor will rotate in one direction when power is applied through the switch 16 and will rotate in the opposite direction when power is applied through the switch 21.

The switch 13 typically is located near the driver of the vehicle. When the driver moves the moveable contact 12 to the fixed contact 14, he selects the high speed of the axle and power is applied to the motor armature through the switches 13 and 16. The motor is mechanically coupled to a ball screw actuator 24 and drives the actuator to shift the axle to high speed. A nut 25 is driven by the ball screw from the position shown toward the switch 16. At the end of travel of the nut, the nut opens the switch 16 which removes the power from the armature and the motor stops.

As the nut travels away from the switch 21, the moveable contact 20 moves to the fixed contact 22 and the switch 21 is closed. If the driver decides to switch to low speed, he moves the moveable contact 12 to the fixed contact 19 and power is applied to the motor armature through the switches 13 and 21. The motor rotates in the opposite direction and the nut is moved to open the switch 16 and close the switch 21. Thus, the switches 16 and 21 function as limit switches to turn off the motor by opening the armature current path.

If one of the switches 16 and 21 fails in the closed mode, the shift control typically is damaged in one of two ways. Either the failed switch is mechanically broken as the motor attempts to drive past the limit, or the motor burns out from continuous operation. On the other hand, the motor may fail to fully shift the axle from one speed position to the other. Such a failure might be caused by the accumulation of dirt or other matter on the ball screw actuator 24, thereby increasing the load placed on the motor, or by higher resistance in circuit between the power supply and the motor, thereby decreasing voltage applied to the motor.

Figure 2:
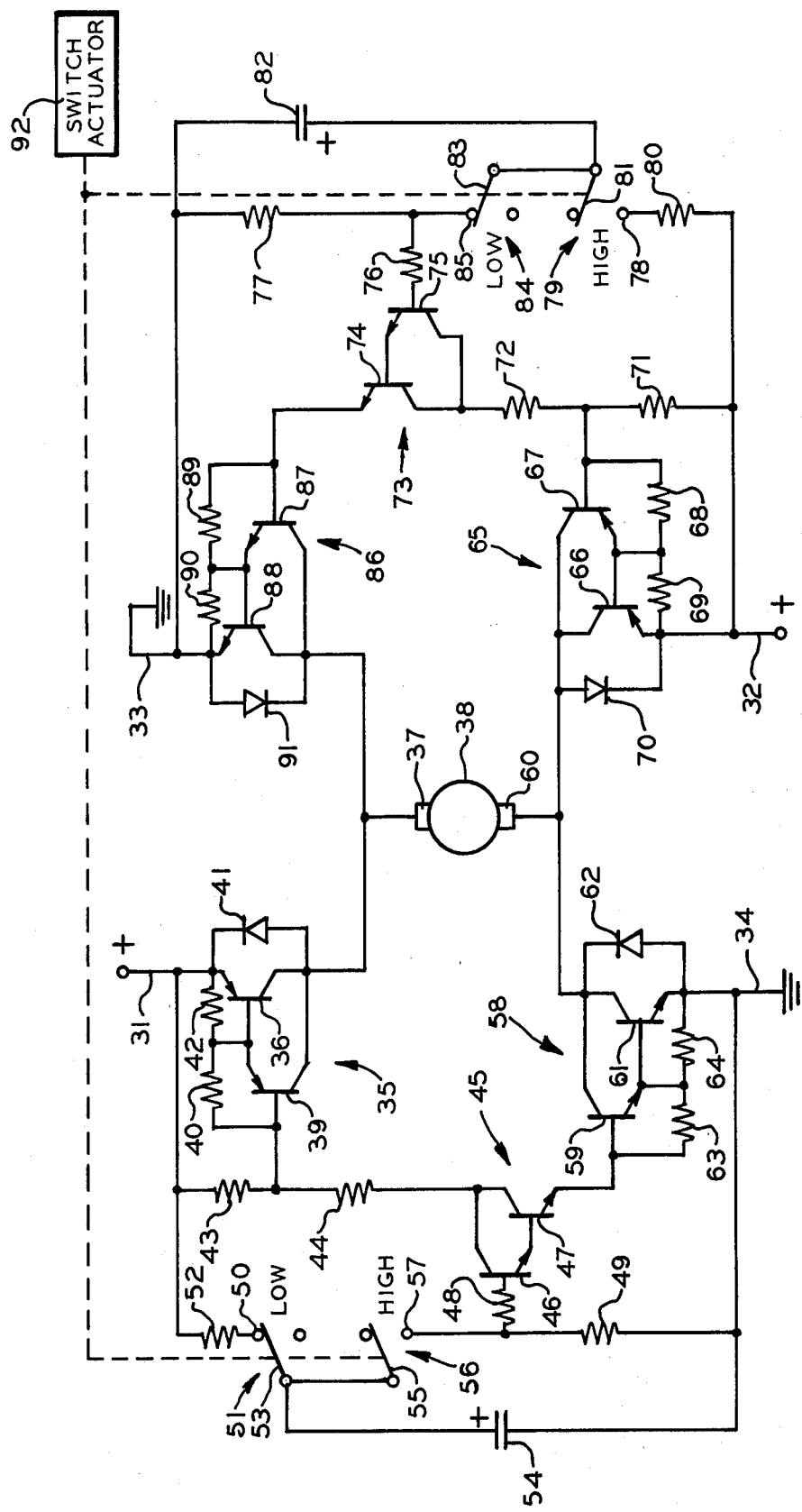
FIG. 2 is a schematic diagram of a shift control circuit according to the present invention.

A schematic diagram of the electrical circuit for the present invention is shown in FIG. 2. The motor for actuating the axle shift linkage is connected to a Darlington bridge circuit controlled by two pairs of magnetically actuatable switches. A control lever having magnets attached thereto is positioned for manual rotation over the switches. When the control lever is moved from one axle speed position to the other axle speed position, the magnets are moved from the proximity of one pair of the switches to the proximity of the other pair of switches. Each pair of switches has an RC circuit associated therewith such that actuation of the switches causes the capacitor to discharge through the bridge circuit and operate the motor for a predetermined time which is equal to the minimum time needed to shift the axle plus a safety factor which is less than the potential burnout time of the motor. As the one capacitor is discharging, the other capacitor is charging for the next shift cycle.

Referring to FIG. 2, a positive potential terminal of a vehicle power supply (not shown) is connected to a pair of input lines 31 and 32 and a negative or ground potential terminal is connected to a pair of return lines 33 and 34. The pairs of lines are utilized instead of single lines only to simplify the schematic representation. The input line 31 supplies power to a Darlington pair transistor amplifier 35. The line 31 is connected to an emitter of a PNP transistor 36 having a collector connected to one side 37 of an armature winding of a permanent magnet motor 38. The transistor 36 also has a base connected to an emitter of a PNP transistor 39 having a collector connected to the collector of the transistor 36. The transistor 39 has a base connected through a resistor 40 to its emitter. A diode 41 has an anode connected to the collectors of the transistors 36 and 39 and a cathode connected to the emitter of the transistor 36. A resistor 42 is connected between the base and the emitter of the transistor 36.

The line 31 is connected to the base of the transistor 39 through a resistor 43 and the base of the transistor 39 is also connected through a resistor 44 to a Darlington pair 45 at a collector of each of a pair of NPN transistors 46 and 47. The transistor 46 has an emitter connected to a base of the transistor 47 and a base connected to the return line 34 through a pair of series connected resistors 48 and 49.

The line 31 is also connected to a fixed contact 50 of a single pole, double throw switch 51 through a resistor 52. A moveable contact 53 of the switch 51 is connected to one side of a capacitor 54 which has its other side connected to the line 34. The moveable contact 53 is connected to a moveable contact 55 of a single pole, double throw switch 56. The switch 56 has a fixed contact 57 which is connected to the junction of the resistors 48 and 49.

An emitter of the transistor 47 is connected to a Darlington pair 58 at a base of an NPN transistor 59. The transistor 59 has a collector connected to the other side 60 of the armature winding of the motor 38 and an emitter connected to a base of an NPN transistor 61. The transistor 61 has a collector connected to the collector of the transistor 59 and an emitter connected to the line 34. A diode 62 has an anode connected to an emitter of the transistor 61 and a cathode connected to the collector of the transistor 61. A resistor 63 is connected between the base and the emitter of the transistor 59 and a resistor 64 is connected between the base and the emitter of the transistor 61.

The circuitry connected between the power lines 32 and 33 is similar to the circuitry described above. The input line 32 is connected to a Darlington pair 65 at an emitter of a PNP transistor 66. The transistor 66 has a collector connected to the other side 60 of the armature winding of the motor 38 and a base connected to an emitter of a PNP transistor 67. The transistor 67 has a collector connected to the other side 60 of the armature winding and a base connected to its emitter through a resistor 68. The transistor 66 has its base connected to the emitter through a resistor 69. A diode 70 has an anode connected to the collectors of the transistors 66 and 67 and a cathode connected to the emitter of the transistor 66.

The input line 32 is connected to the base of the transistor 67 through a resistor 71. The resistor 71 and a resistor 72 are connected in series to a Darlington pair at a collector of an NPN transistor 74 and a collector of an NPN transistor 75. The transistor 74 has a base connected to an emitter of the transistor 75 which has a base connected to the return line 33 through a pair of series connected resistors 76 and 77.

The input line 32 is also connected to a fixed contact 78 of a single pole, double throw switch 79 through a resistor 80. The switch 79 has a moveable contact 81 connected to one side of a capacitor 82 having its other side connected to the return line 33. The moveable contact 81 is also connected to a moveable contact 83 of a single pole, double throw switch 84. The switch 84 has a fixed contact 85 connected to the junction of the resistors 76 and 77.

An emitter of the transistor 74 is connected to a Darlington pair 86 at a base of an NPN transistor 87. The transistor 87 has a collector connected to the one side 37 of the armature winding and to a collector of an NPN transistor 88. The base of the transistor 87 is connected to an emitter of the transistor 87 through a resistor 89. The emitter of the transistor 87 is also connected to a base of the transistor 88. The base of the transistor 88 is connected through a resistor 90 to the emitter of the transistor 88. An anode of a diode 91 is connected to the emitter of the transistor 88 and a cathode is connected to the collector of the transistor 88. The moveable contacts 53, 55, 81, and 83 are magnetically coupled to a switch actuator 92 which will be described in detail below.

Figure 3:
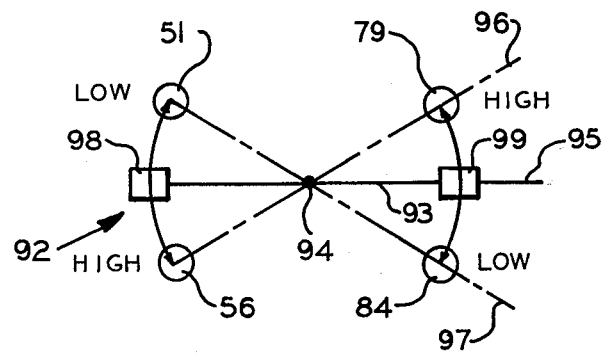
FIG. 3 is a schematic diagram of the switch actuator of FIG. 2.

There is shown in FIG. 3 in schematic form the switch actuator 92. The actuator includes a lever arm 93 pivotally mounted at 94 and having a knob end 95 for manually rotating the lever arm between a high speed position 96 and a low speed position 97 shown in phantom. A pair of magnets 98 and 99 are attached to the lever arm 93 and are equally spaced from the pivot point 94. When the lever arm 93 is moved to the high speed position 96, the switches 56 and 79 are actuated to the closed position and the switches 51 and 84 are in the open position. When the lever arm 93 is moved to the low speed position 97, the switches 51 and 84 are actuated to the closed position and the switches 56 and 79 are in the open position.

In FIG. 2, the switch actuator 92 is in the low speed position and the switches 51 and 84 are in the closed position. Assuming that the circuit has been in the low speed position for a sufficient time, the capacitor 54 will be fully charged through the resistor 52 connected to the positive potential at the line 31 and the capacitor 82 will be fully discharged through the resistor 77 connected to the ground potential at the line 33.

When the switch actuator 92 is shifted to the high speed position, the switches 51 and 84 will be opened and the switches 56 and 79 will be closed. The capacitor 54 will apply the power supply potential at the fixed contact 57 to turn on the Darlington pair 45. The Darlington pair 45 in turn provides current flow through the resistors 43 and 44 to turn on the Darlington pair 58. The Darlington pair 58 thus provides a current path from the other side 60 of the armature to the ground potential return line 34. The flow of current through the Darlington pair 45 creates a voltage drop across the resistor 43 to place the base of the transistor 39 at a lower potential than the emitter of the transistor 39. Thus, the Darlington pair 35 is turned on and current flows from the input line 31 to the one side 37 of the armature winding. When the capacitor 54 has sufficiently discharged, the Darlington pair 45 will be turned off thereby turning off the Darlington pairs 35 and 58 and stopping the motor 38. The discharge time of the capacitor 54 can be controlled through the selection of the values of the resistors 48 and 49 and should be set at a value between the minimum time required to shift the axle and the probable burnout time of the motor.

After the Darlington pair 45 has turned off, the capacitor 54 will completely discharge through the resistor 49. During the time that the motor 38 was actuated, the capacitor 82 was charging through the resistor 80. If the switch actuator 92 is moved back to the low speed position shown in FIG. 2, the switch 79 will be opened and the switch 84 will be closed. The capacitor 82 will supply potential at the fixed contact 85 to turn on the Darlington pair 73. The Darlington pair 73 in turn provides current flow through the resistors 71 and 72 to turn on the Darlington pair 86. The Darlington pair 86 thus provides a current path from the one side 37 of the motor armature to the ground potential return line 33. The flow of current through the Darlington pair 86 creates a voltage drop across the resistor 71 to place the base of the transistor 67 at a lower potential than the emitter of the transistor 67. Thus, the Darlington pair 65 is turned on and current flows from the input line 32 to the other side 60 of the motor armature to drive the motor in the opposite direction and shift the axle back to the low speed position.

When the capacitor 82 has sufficiently discharged, the Darlington pair 73 will be turned off thereby turning off the Darlington pairs 65 and 86 and stopping the motor. The discharge time of the capacitor 82 can be controlled through the selection of the values of the resistors 76 and 77.

It can be seen that the Darlington pairs 35, 58, 65, and 86 constitute a bridge circuit for providing power to the motor 38. When the Darlington pairs 35 and 58 are turned on, current flows through the armature winding of the motor 38 in a direction to cause the motor to actuate the shift mechanism to the high speed position for the axle. When the Darlington pairs 65 and 86 are turned on, current flows through the armature winding in a direction to cause the motor to actuate the shift mechanism to the low speed position for the axle.

The switches 51 and 79 carry only the charging current to the capacitors 54 and 82 respectively. The switches 56 and 84 carry only the drive current for the Darlington pairs 45 and 73 respectively. These currents are relatively small and, therefore, the switches will have a longer life than the switches used to carry the armature current in the prior art devices. Furthermore, the motor is protected against burnout should a switch fail in the closed mode since the Darlington pairs automatically turn off when the capacitors 54 and 82 discharge respectively.

Figure 4:
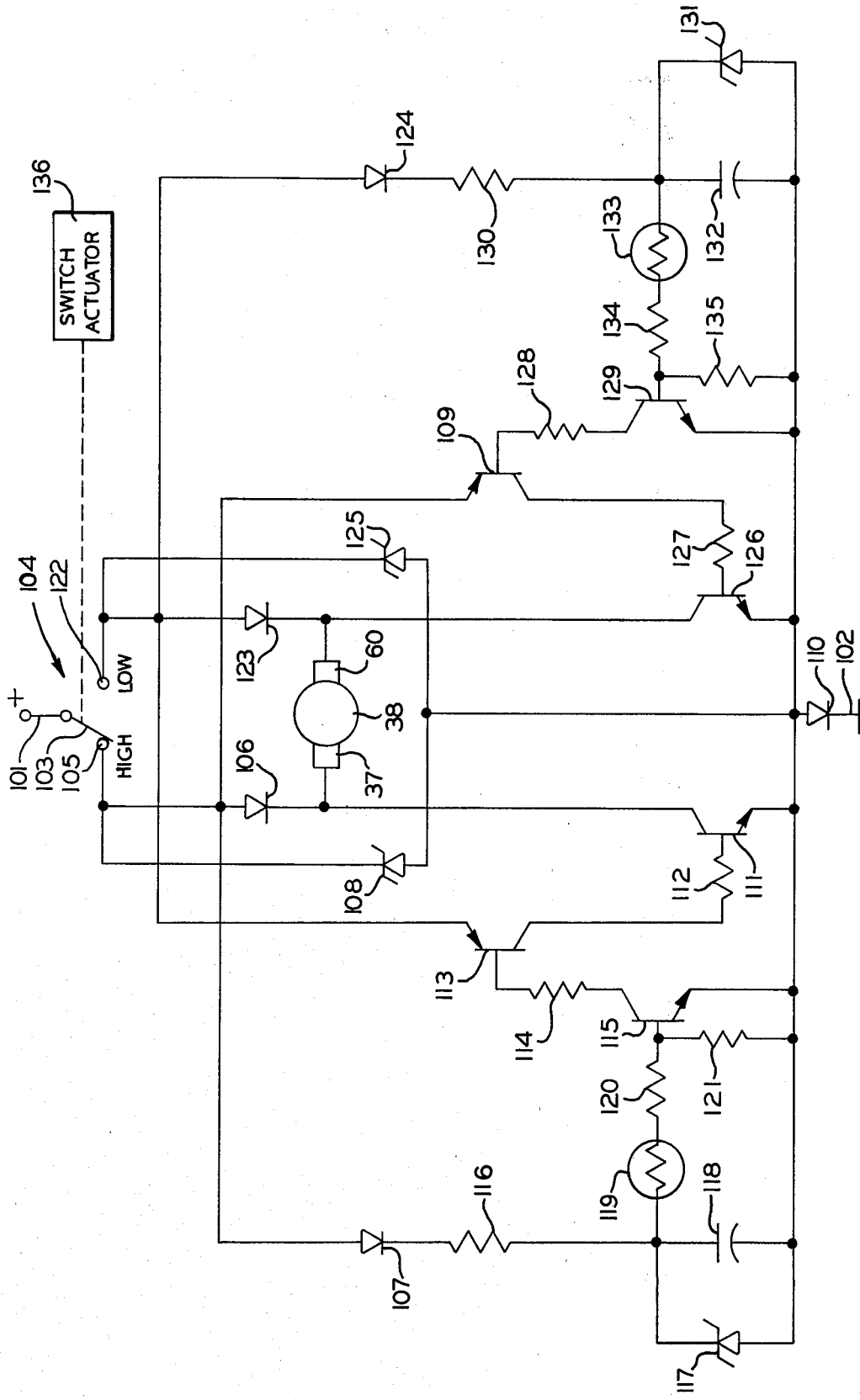
FIG. 4 is a schematic diagram of an alternative embodiment of the switch control circuit.

FIG. 4 illustrates an alternate embodiment of the present invention. A positive potential terminal of the vehicle power supply is connected to an input line 101 and a negative or a ground potential terminal is connected to a return line 102. The input line 101 supplies power to a moveable contact 103 of a single pole, double throw switch 104. The switch 104 has a fixed contact 105 which is connected to the junction of an anode of a diode 106, an anode of a diode 107, a cathode of a zener diode 108, and an emitter of a PNP transistor 109. The zener diode 108 has an anode connected to an anode of a diode 110. A cathode of the diode 110 is connected to ground potential by the line 102.

The diode 106 has a cathode connected to the junction of one side 37 of the permanent magnet motor 38 and a collector of an NPN transistor 111. An emitter of the transistor 111 is connected to the anode of the diode 110. A base of the transistor 111 is connected through a resistor 112 to a collector of a PNP transistor 113. A base of transistor 113 is connected through a resistor 114 to a collector of an NPN transistor 115.

The diode 107 has a cathode connected through a resistor 116 to the junction of a cathode of a zener diode 117, a capacitor 118, and a thermistor 119. An anode of the zener diode 117 and the capacitor 118 are connected to ground potential through the diode 110. The thermistor 119 is connected to a resistor 120, which is connected to the junction of a resistor 121 and a base of the transistor 115. The resistor 121 and an emitter of the transistor 115 are connected to ground potential through the diode 110.

The switch 104 has a second fixed contact 122 which is connected to the junction of an anode of a diode 123, an anode of a diode 124, a cathode of a zener diode 125, and an emitter of the transistor 113. The zener diode 125 has an anode connected to the anode of the diode 110.

The diode 123 has a cathode connected to the junction of the other side 60 of the permanent magnet motor 38 and a collector of an NPN transistor 126. An emitter of the transistor 126 is connected to the anode of the diode 110. A base of the transistor 126 is connected through a resistor 127 to a collector of the transistor 109. A base of the transistor 109 is connected through a resistor 128 to a collector of an NPN transistor 129.

The diode 124 has a cathode connected through a resistor 130 to the junction of a cathode of a zener diode 131, a capacitor 132, and a thermistor 133. An anode of the zener diode 131 and the capacitor 132 are both connected to the ground potential through the diode 110. The thermistor 133 is connected through a resistor 134 to the junction of a base of transistor 129 and a resistor 135. An emitter of transistor 129 and the resistor 135 are both connected to ground potential through the diode 110.

The zener diodes 108 and 125 protect the motor 38 and the shift control circuit from high power transient signals which might arise when the switch 104 is actuated. The zener diodes 108 and 125 are commercially available under the semiconductor designation 1N6280 and provide protection up to 1500 watts. The diode 110 protects the zener diodes 108 and 125 from damage caused by current reversal. The termistors 119 and 133 are variable resistance devices which are sensitive to temperature. As the sensed temperature decreases, the resistance of the thermistor increases correspondingly.

In FIG. 4, a switch actuator 136, which can be one half of the actuator 92, is in the high speed position and the moveable contact 103 of the switch 104 is connected to the fixed contact 105. Assuming that the switch 104 has been moved to the high speed position, the capacitor 118 will rapidly charge through the resistor 116 connected to the positive potential terminal at the line 101 and the capacitor 132 will discharge through the line 102 to ground potential. Power is supplied through the resistor 116, the thermistor 119, and the voltage-dividing resistors 120 and 121 to the base of the transistor 115. However, because the emitter of the transistor 113 is connected to an open circuit, no current flows through resistor 112 to the base of the transistor 111. Thus, the transistor 111 is turned off and no current flows through it.

Similarly, no current flows through the transistor 126. Because the discharged capacitor 132 is an effective short circuit to ground potential, no current flows into the base of the transistor 129. Thus, there is an open circuit between the collector and emitter of the transistor 129 which prevents any flow of current from the base of the transistor 109. Even though the emitter of the transistor 109 is properly biased, no current flows from the collector of the transistor 109 through the resistor 127 and into the base of the transistor 126. This causes the transistor 126 to be turned off and no current flows through it. The motor 38 remains inactive because there is no complete circuit through which the power supplied to the one side 37 can flow.

When the switch actuator 136 is shifted to the low speed position, the moveable contact 103 of the switch 104 will be connected with the other fixed contact 122 and power will be supplied to the other side 60 of the motor 38. Power will also be supplied to the emitter of the transistor 113, properly biasing it for conduction. The capacitor 118, which had been charged up to the regulating zener diode potential, begins to discharge through the thermistor 119 and the voltage-dividing resistors 120 and 121. Thus, the transistor 115 continues to be biased for conduction while the capacitor 118 discharges, even though the power has been removed from the fixed contact 105. The transistors 113 and 115 turn on together, causing current to flow through the resistor 112 into the base of transistor 111. When the transistor 111 is turned on, the power which is supplied to the other side 60 of the motor 38 has a complete closed circuit through which to pass and the motor 38 becomes activated. The power which is supplied to the moveable contact 122 also biases the transistor 129 for conduction. However, since the power has simultaneously been removed from the emitter of the transistor 109, the transistor 126 remains in a non-conductive state. Meanwhile, the capacitor 132 begins to store a charge until it reaches the potential of the regulating zener diode.

The transistor 111 will continue to conduct so long as the capacitor 118 is able to supply sufficient power to the transistor 115 to keep it biased for conduction. The discharge time of the capacitor 118 can be controlled through the selection of the values of the resistors 120 and 121. Also, the resistance of the thermistor 119 will vary the discharge time of the capacitor 118. As the sensed temperature decreases, the resistance of the thermistor 119 increases and the capacitor 118 will discharge more slowly. Thus, the time period for which the transistor 115 will be turned on increases with the decreased temperature sensed by the thermistor 119. When the capacitor 118 has sufficiently discharged, the transistor 115 will be turned off causing the transistor 111 to stop conducting. Thus, the open circuit will be restored and the motor 38 will again become inactive. As described above, the discharge time should be set at a value between the minimum time required to shift the axle and the probable burnout time of the motor 38. It will be appreciated by those skilled in the art that the shift control circuit functions similarly when shifted from the low to the high speed position.

In summary, the present invention relates to an electrically actuated shift apparatus for multi-speed axle including an electric power source and an electric motor coupled to actuate means for shifting the axle. A control means includes means for generating a shift signal, means responsive to the shift signal for generating the control signal for a predetermined time, and means responsive to the control signal for connecting the power source to the motor for the predetermined time to shift the axle from one speed to another speed.

In accordance to the provisions of the patent statutes, the principle and mode of operation have been described and illustrated in its preferred embodiment. However, it must be understood that the invention can be practiced otherwise than a specifically illustrated and described without departing from its spirit or scope.

What is claimed is:

1. In an electrically actuated shift apparatus for a multi-speed axle including an electric power source and an electric motor coupled to actuate means for shifting the axle, a control means comprising:
   means for generating a shift signal;
   means responsive to said shift signal for generating a control signal for a predetermined time; and
   means responsive to said control signal for connecting the power source to the motor for said predetermined time to shift the axle from one speed to another speed.

2. The control means according to claim 1 wherein said means for generating a shift signal includes magnetic means manually actuatable between a first position and a second position and wherein said means for generating a control signal includes means responsive to the movement of said magnetic means from said first position to said second position for generating said control signal.

3. The control means according to claim 1 wherein said means for generating a control signal includes energy storage means connected to the power source for accumulating a predetermined electrical charge and means responsive to said shift signal for connecting said energy storage means to said means responsive to said control signal to generate said control signal by discharging said electrical charge.

4. The control means according to claim 3 wherein said energy storage means includes a capacitor connected to the power source for accumulating said electrical charge.

5. The control means according to claim 4 wherein said means for generating a shift signal includes magnetic means manually actuatable between a first position and a second position and said means for connecting said energy storage means includes a magnetically actuatable switch for connecting the power source to said energy storage means when said magnetic means is in said first position and for connecting said energy storage means to said means responsive to said control signal when said magnetic means is in said second position.

6. The control means according to claim 3 wherein said means for generating a shift signal includes a switch means actuatable between a first position and a second position for generating said shift signal.

7. The control means according to claim 6 wherein said switch means is a single pole, double throw switch.

8. The control means according to claim 1 wherein said means for generating a control signal for a predetermined time includes means for varying the duration of said predetermined time.

9. The control means according to claim 8 wherein said means for varying includes a thermistor.

10. The control means according to claim 1 wherein said means for generating a shift signal includes switch means manually actuatable between a first position and a second position for generating a first shift signal and manually actuatable between said second position and said first position for generating a second shift signal; said means for generating a control signal is responsive to said first shift signal for generating a first control signal and is responsive to said second shift signal for generating a second control signal; and said means responsive to said control signal includes means responsive to said first control signal for connecting the power source to the motor for said predetermined time to shift the axle from said one speed to said another speed and means responsive to said second control signal for connecting the power source to the motor for said predetermined time to shift the axle from said another speed to said one speed.

11. The control means according to claim 1 wherein said means for generating a shift signal includes magnetic means manually actuatable between a first position and a second position; said means for generating a control signal includes means responsive to the movement of said magnetic means from said first position to said second position for generating a first control signal and responsive to the movement of said magnetic means from said second position to said first position for generating a second control signal; and said means responsive to said control signal includes means responsive to said first control signal for connecting the power source to the motor for said predetermined time to shift the axle from said one speed to said another speed and means responsive to said second control signal for connecting the power source to the motor for said predetermined time to shift the axle from said another speed to said one speed.

12. In an electrically actuated shift apparatus for a two-speed axle including an electrical power source and an electric motor coupled to actuate means for shifting the axle, a control means comprising:
means for generating first and second shift signals;
means responsive to said first and second shift signals for generating first and second control signals respectively for first and second predetermined times respectively, and
means responsive to said first control signal for connecting the power source to the motor for said first predetermined time to shift the axle from a first speed to a second speed and responsive to said second control signal for connecting the power source to the motor for said second predetermined time to shift the axle from said second speed to said first speed.

13. The control means according to claim 12 wherein said means for generating said first and second shift signals includes first and second magnetic means actuatable between first and second positions and wherein said means for generating said first and second control signals includes means responsive to the movement of said first magnetic means from said first position to said second position for generating said first control signal and means responsive to the movement of said second magnetic means from said second position to said first position for generating and second control signal.

14. The control means according to claim 13 wherein said means responsive to the movement of said first magnetic means includes first energy storage means connected to the power source for accumulating a first predetermined electrical charge, and first means responsive to said first shift signal for connecting said energy storage means of said means responsive to said first control signal to generate said first control signal by discharging said first electrical charge, and wherein said means responsive to the movement of said second magnetic means includes second energy storage means connected to the power source for accumulating a second predetermined electrical charge, and second means responsive to said second shift signal for connecting said second energy storage means to said means responsive to said second control signal to generage said second control signal by discharging said second electrical charge.

15. In an electrically actuated shift apparatus for a two-speed axle including an electric power source and an electric motor coupled to actuate means for shifting the axle, a control means comprising:
magnetic means manually actuatable for generating first and second shift signals;
means responsive to said first and second shift signals for generating first and second control signals respectively, each for a predetermined time; and
means responsive to said first control signal for connecting the power source to the motor for said predetermined time to shift the axle from a first speed to a second speed and responsive to said second control signal for connecting the power source to the motor for said predetermined time to shift the axle from said second speed to said first speed.

* * * * *